Nov. 3, 1959      G. A. LYON      2,911,257
WHEEL COVER AND METHOD AND MEANS FOR MAKING SAME
Filed April 27, 1954      3 Sheets-Sheet 1
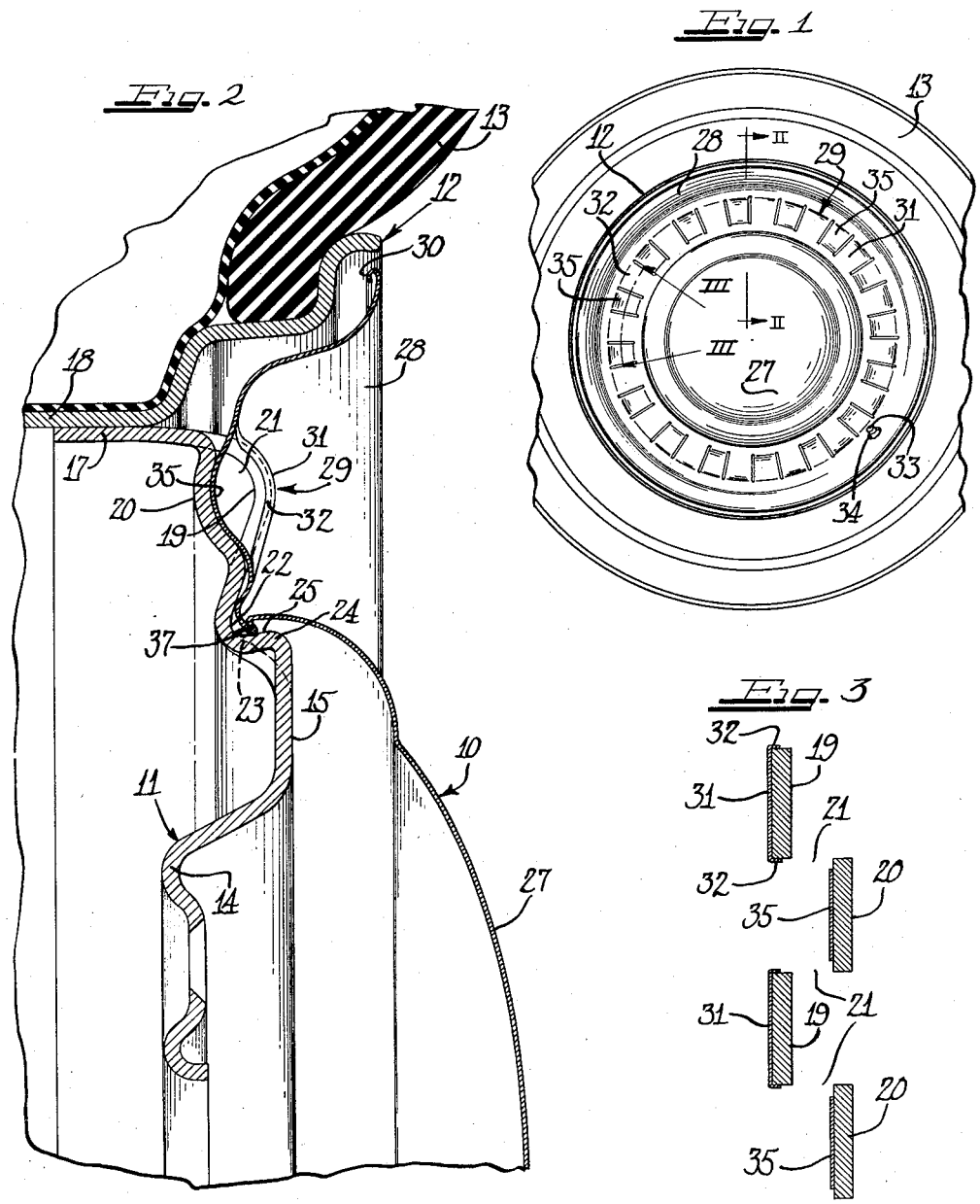
Inventor
GEORGE ALBERT LYON

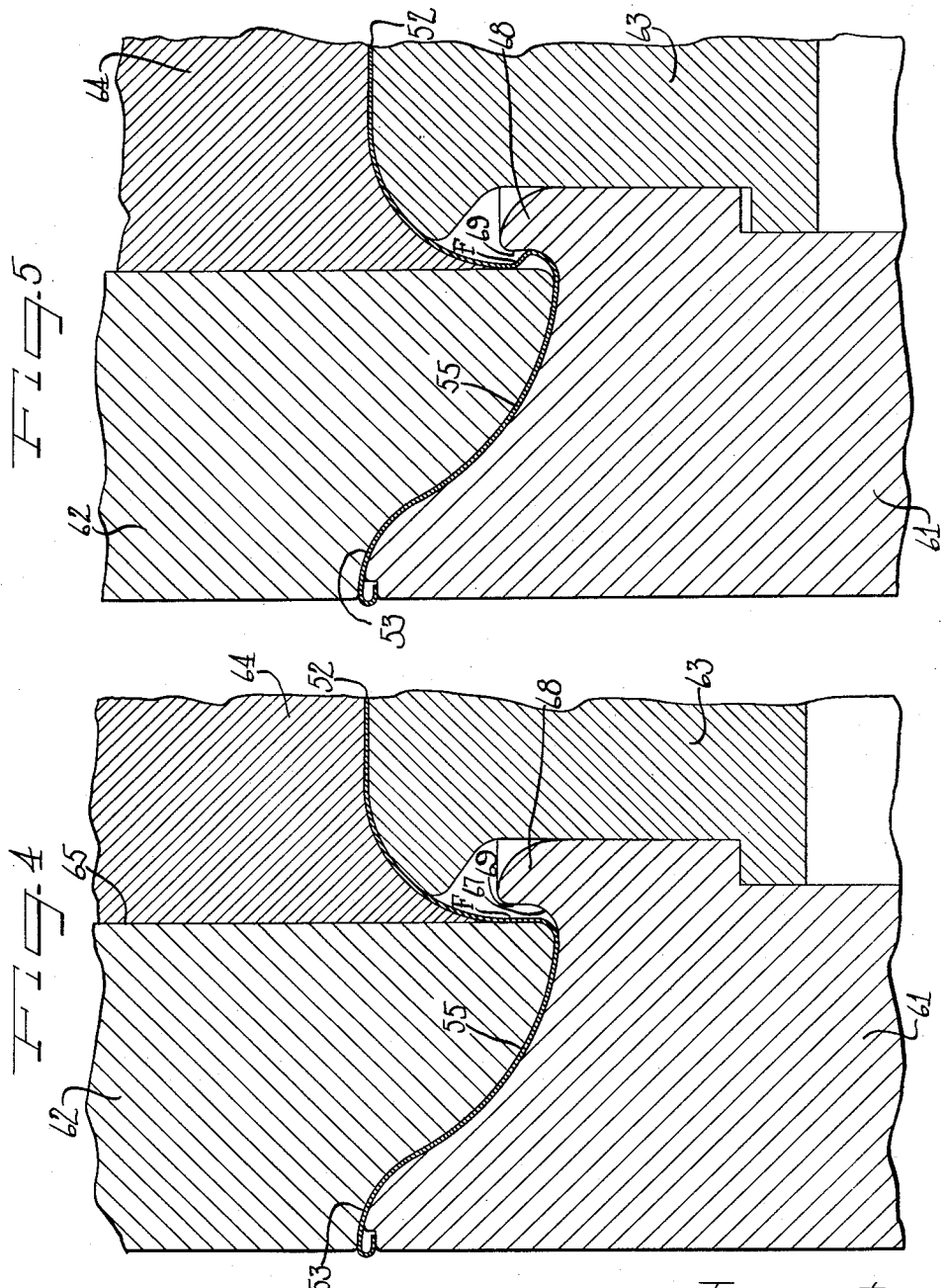

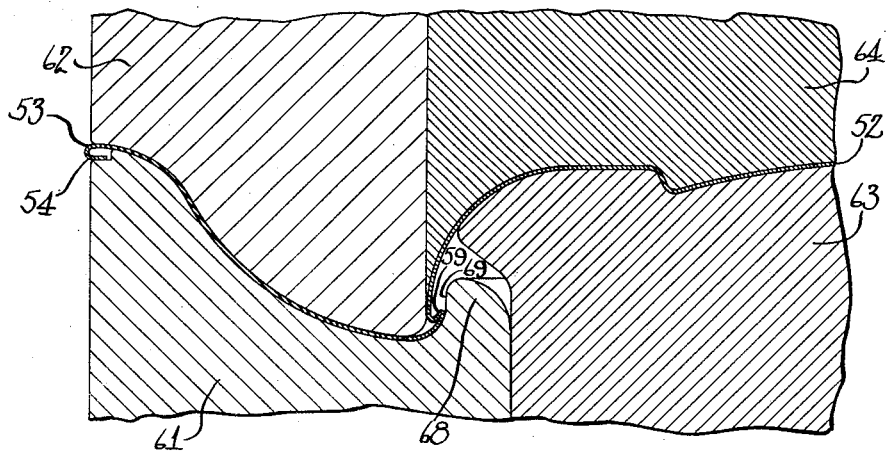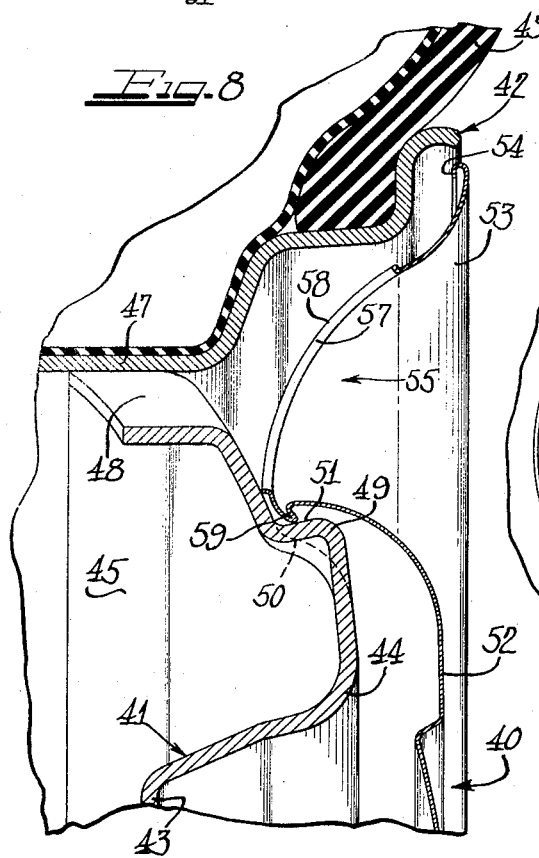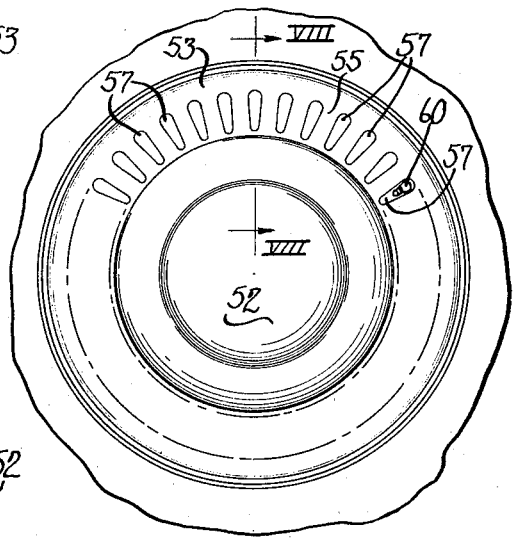

United States Patent Office 2,911,257
Patented Nov. 3, 1959

2,911,257

WHEEL COVER AND METHOD AND MEANS FOR MAKING SAME

George Albert Lyon, Detroit, Mich.

Application April 27, 1954, Serial No. 425,865

10 Claims. (Cl. 301—37)

The present invention relates to improvements in wheel covers and more particularly concerns novel construction of such covers for press-on, pry-off engagement with vehicle wheels, and a method of and means for making the covers.

An important object of the present invention is to provide an improved wheel cover having novel means for retaining engagement with a vehicle wheel.

Another object of the invention is to provide improved means in a wheel cover for retaining engagement with retaining bumps on a wheel body.

A further object of the invention is to provide an improved method of making wheel covers.

Still another object of the invention is to provide improved means for making wheel covers.

Other objects, features and advantages of the present invention will be readily apparent from the following detailed description of certain preferred embodiments thereof taken in conjunction with the accompanying drawings wherein:

Figure 1 is a side elevational view of a wheel structure embodying features of the present invention;

Figure 2 is an enlarge fragmentary radial sectional view taken substantially on the line II—II of Figure 1;

Figure 3 is a fragmentary enlarged sectional detail view taken substantially on the line III—III of Figure 1;

Figure 4 is a fragmentary vertical sectional view through forming die apparatus in which a cover blank is adapted to be formed with a folded cover retaining flange structure;

Figure 5 is a sectional view similar to Figure 4 but showing the forming die apparatus in a preliminary forming position;

Figure 6 is a fragmentary sectional view similar to Figures 4 and 5 but showing the die apparatus at the end of a forming stroke thereof;

Figure 7 is a side elevational view of a wheel structure showing a modification of the cover; and Figure 8 is a fragmentary radial sectional view taken substantially on the line VIII—VIII of Figure 7.

Having reference to Figures 1, 2 and 3, a one-piece, full disk cover 10 is applied in protective, ornamental relation to the outer side of a vehicle wheel comprising a disk spider wheel body 11 and a multi-flange, drop-center tire rim 12 adapted to support a pneumatic tire and tube assembly 13. The wheel body 11 includes a central dished bolt-on flange 14, an intermediate generally axially outwardly extending annular nose bulge 15 and a peripheral generally axially inwardly directed annular attachment flange 17 which is suitably secured to a base flange 18 of the tire rim. Between the nose bulge 15 and the marginal attachment flange 17 the wheel body is provided with an annular portion which is slit along radial lines at predetermined spaced intervals and with the material between the slits alternately directed into axially outwardly humped or bowed portions 19 and axially inwardly humped or bowed portions 20 defining therebetween generally circumferentially directed air circulation openings 21 through the cover body.

Radially inwardly from the spoke-like alternately oppositely bowed portions 19 and 20 of the cover body, and at the radially outer side of the nose bulge 15 is provided an annular axially outwardly opening groove 22, defined at its radially inner side by a generally radially outwardly facing annular shoulder 23 on the nose bulge. From the shoulder 23 project a plurality, such as three or four, uniformly annularly spaced generally axially outwardly and radially outwardly projecting cover retaining bumps 24 having generally radially outwardly and axially inwardly facing oblique cover retaining respective shoulders 25. This construction is covered in my Patent 2,445,330, issued July 20, 1948.

The cover 10 is of a diameter to substantially fully cover the outer side of the wheel and to this end has a central crown portion 27 which overlies the bolt-on flange 14 and the nose bulge 15, a radially outer annular portion 28 for substantially concealing the tire rim 12, and an intermediate annular portion 29 which is inset relative to the crown and outer marginal annular portions 28 and is arranged to cooperate in substantially concealing relation with the spoke-like portions 19 and 20 of the wheel body. At its edge extremity, the outer marginal portion 28 of the cover is provided with an underturned reinforcing and finishing bead 30. For overlying the spoke-like bulged portions 19 of the wheel body, the intermediate portion 29 of the cover is provided with complementary axially outwardly bulging radially extending portions 31 which lie in nested relation upon the wheel body portions 19 and have generally axially inwardly directed side flanges 32 engaging with the side edges of the portions 19 in generally concealing, finishing relation and to hold the cover against turning on the wheel so that a valve stem 33 will remain in registration with a valve stem opening 34 in the cover. In nested engagement with the wheel body portions 20 are inwardly bulged or bowed spokelike portions 35 of the intermediate cover portion 29 defining with the spoke portions 31 of the cover openings through the cover registering with the openings 21 in the wheel body for air circulation through the cover.

For retaining the cover 10 upon the wheel, there is provided at juncture of the crown portion 27 of the cover with the intermediate portion 29 of the cover a generally radially inwardly and axially outwardly extending collapsed annular continuous fold flange 37 engageable retainingly with the retaining bumps 24. For this purpose the retaining flange 37 is of an inside diameter which is slightly less than the diameter circumscribed by the retaining shoulders 25 of the retaining bumps. By virtue of its collapsed generally radially inwardly and axially outwardly oblique underturned formation, the retaining flange fold 37 is resiliently flexible in a generally radially outward direction, so that when the cover is centered with respect to the wheel and with the oblique inner face of the flange fold cammingly engaging the noses of the bumps 24, axially inward pressure will cause the flange fold to flex and snap behind the noses of the retaining bumps and into retaining tensioned engagement with the bump shoulders 25 to thereby draw the cover firmly axially inwardly into retained engagement with the wheel. By reason of the cam surface provided by the inner side of the fold flange 37, a fairly easy camming of the fold flange over the retaining bumps 24 enables an easy-on attachment of the cover to the wheel. On the other hand, the double layer structure of the fold flange 37 affords substantial resilience in the fold flange which causes the inner edge of the fold flange to engage firmly against the bump shoulders 25. This assures that the cover will not be unintentionally displaced from the wheel. Yet, the cover can be removed from the wheel by application of pry-off force therebehind acting to cam the retaining fold flange 37 out of engagement with the retaining bumps 24.

Referring now to the modification shown in Figures 7 and 8, a full disk cover 40 is adapted to be applied to the outer side of a wheel comprising a wheel body 41 supporting a tire rim 42 of the multi-flange drop-center type adapted to have mounted thereon a pneumatic tire and tube assembly 43. The wheel body 41 includes a central dished bolt-on flange 43, an intermediate annular axially outwardly directed nose bulge 44 and an outer marginal generally axially inwardly extending attachment flange 45 which is suitably secured to a base flange 47 of the tire rim. At suitable intervals such as three or four, the attachment flange 45 is inset to provide air circulation openings 48 through the wheel.

For retaining the cover 40 on the wheel, the wheel body 41 is provided at the radially outer side of the nose bulge 44 with a series of annularly spaced generally radially outwardly and axially outwardly directed cover retaining bumps 49 with an annular generally radially outwardly directed shoulder 50 inset from generally radially and axially inwardly sloping oblique retaining faces 51 on the bumps 49.

The cover 40 comprises a central crown portion 52 for overlying the bolt-on flange 43 and the nose bulge 44 of the wheel body. A radially outer marginal portion 53 of the cover is adapted to overlie the tire rim and has the edge extremity thereof turned under to provide a reinforcing and finishing bead 54. Intermediate the marginal portion 53 and the crown 52 is an annular generally inwardly dished portion 55 which lies opposite the juncture of the wheel body and the tire rim and is preferably provided with a series of air circulation openings 57 which are preferably defined by respective inturned reinforcing and finishing flanges 58 which are preferably continuous about the apertures.

At juncture of the crown portion 52 and the intermediate portion 55 of the cover is provided an underturned generally radially inwardly and axially outwardly directed annular cover retaining fold flange 59 comprising a pair of annular layers of the material of the cover folded upon themselves and mutually providing a resilient retaining flange or shoulder adapted to engage under resilient tension retainingly against the retaining shoulders 51 of the retaining bumps 49. The axially inner side of the fold flange 59 provides a generally radially inwardly and axially outwardly sloping cam surface engageable with the bumps 49 for camming the fold flange 59 thereover when the cover is pressed axially inwardly to position on the wheel. When the cover is fully on the wheel it will be observed that the radially inner end portions of the aperture defining flanges 58 are pressed axially inwardly against the wheel body radially outwardly from the retaining bumps 49, by the resilient tensioned coaction of the fold flange 59 with the bumps and thereby the cover is held against turning on the wheel since the burrs or roughness at the edges defining the flanges 58 act against the cover body as spurs or anchor points to resist turning. Thereby distortion of a valve stem 60 extending through one of the apertures 57 in the cover will be avoided.

In Figures 4, 5 and 6 is shown appartus in the form of a forming die by which is adapted to be practiced a novel method of forming the fold flanges 37 or 59 of the respective covers 10 and 40. This method comprises working a generally axially extending annular flange portion of the cover blank into the fold flange. Practice of the method will be readily understood from a description of the operation of the forming die means.

Having reference to Figure 4, it will be observed that the die structure comprises an annular supporting die member 61, a hold down die member 62 cooperating therewith, a central crown supporting die member 63 reciprocable within the die ring 61, and a reciprocable pressure or ram die member 64 reciprocable within the hold-down die ring 62. All of the die components are shaped on their cover engaging surfaces to conform to the basic shape to which the cover blank has been drawn from suitable sheet metal such as stainless steel or brass or the like. In the present instance the cover blank for making the cover 40 has been selected, but it will be understood that the blank for making the cover 10 could just as well have been chosen and that insofar as the operation of the die machanism is concerned in reducing the cover retaining fold flange the construction and operation of the die mechanism will be the same for either of the covers. Before placing the cover blank in the die mechanism it will have been drawn to shape, including the crown shape, the shape of the outer annular or marginal portion and the shape of the intermediate portion. However, at the radially outer side of the crown portion of the cover and extending to juncture with the intermediate portion of the cover is provided a generally axially extending flange F, the material of which is to be shaped into the underturned resilient fold flange of the cover.

It will be understood, of course, that the upper die members 62 and 64 are separable from the lower die members 61 and 63 to a sufficient distance to enable mounting of the partially drawn cover in the die and after the forming operation to enable removal of the cover. After the partially completed cover has been placed in the die assembly, the hold-down die ring 62 firmly holds the outer annnular portion 53 and the intermediate portion 55 of the cover against the supporting die ring 61. An inner surface 65 on the holddown die ring 62 conforms to and engages about the radially outer side of the flange F of the cover blank. The reciprocal upper or pressure die member 64 is reciprocably guided by the cylindrical surface 65 into engagement with the crown 52 of the cover blank, and the lower crown engaging die member 63 engages the inner side of the crown 52.

In shaping the flange F into the folded condition, the pressure applying die member 64 is driven axially toward the central crown engaging die ring 63 while the supporting die ring 61 and the hold-down die ring 62 hold the clamped intermediate and outer marginal portions of the cover blank stationary. As a result, the axial flange F in the portion thereof adjacent juncture with the intermediate cover portion 55 is caused to work by a generally radially inwardly and axially outward rolling, cold working action along a radially inwardly and axially outwardly sloping, preferably arcuate surface 67 provided at the radially inner side of an annular forming rib 68 provided on the lower die member 61, substantially as shown in Figure 5. This radially inward and axially outward rolling of the flange F continues until a generally cylindrical annular surface 69 on the forming rib or ridge 68 spaced a predetermined distance radially inwardly from the cylindrical surface 65 is encountered. From this point on, as the forming die member 64 continues pressing axially inwardly against the crown 52, the flange F folds in upon itself until a reverse bend collapsed condition of the flange has been attained as shown in Figure 6, thereby providing the fold flange 59 in the case of the cover 40, or the fold flange 37 of the case of the cover 10. As a result of the cold working to which the material of the flange F is subjected work hardens and improves the resilience of the fold flange structure.

After the cover blank is released from the fold flange forming die assembly, it may be formed with the apertures in the intermediate portion thereof.

It will be understood that modifications and variations may be effected without departing from the scope of the novel concepts of the present invention.

I claim as my invention:

1. In a wheel structure including a tire rim and a disk spider wheel body supporting the tire rim and having an annular nose bulge provided at the radially outer side thereof with a generally radially outwardly facing shoulder from which project generally radially and axially outwardly cover retaining bumps, a cover for disposition at the outer side of the wheel having a central portion for overlying the wheel body including the nose bulge and a radially outer portion for overlying the tire rim with an intermediate portion between said inner and outer portions, and a return bent flange fold adjacent juncture of the crown and intermediate portions of the cover directed generally radially inwardly and axially outwardly and engageable retainingly under resilient tension with the retaining bumps, said intermediate cover portion having means thereon interengageable with the wheel body radially outwardly from the bumps for retaining the cover against turning on the wheel.

2. In a wheel structure including a tire rim and a disk spider wheel body supporting the tire rim and having an annular nose bulge provided at the radially outer side thereof with a generally radially outwardly facing shoulder from which project generally radially and axially outwardly cover retaining bumps, a cover for disposition at the outer side of the wheel having a central portion for overlying the wheel body including the nose bulge and a radially outer portion for overlying the tire rim with an intermediate portion between said inner and outer portions, and a return bent flange fold adjacent juncture of the crown and intermediate portions of the cover directed generally radially inwardly and axially outwardly and engageable retainingly under resilient tension with the retaining bumps, said intermediate cover portion having means thereon interengageable with the wheel body radially outwardly from the bumps for retaining the cover against turning on the wheel, said intermediate cover portion having air circulation openings therethrough adjacent to said means.

3. In apparatus for providing a performed sheet metal wheel cover blank wtih an intermediately located annular concealed generally axially outwardly and radially angled annular retaining flange engageable wtih retaining bumps on a vehicle wheel, comprising a die member upon which a circular portion of the cover blank is engageable while a generally axially extending intermediate integral flange portion of the cover is directed away from the die member and joined to a second circular integral portion of the cover spaced axially from the die member, a second die member for engaging and clamping the portion of the cover that engages the first mentioned die member, and a third die member for engaging and pressing said second cover portion toward said first mentioned die member to place said flange under axial compression toward the first mentioned die member, said first mentioned die member having a generally axial extending circular forming portion projecting axially toward said third die member and spaced radially from said second die member so as to be initially spaced radially from the cover flange, said forming portion having a forming surface sloping generally axially outwardly and radially away from that portion of the first die member at which juncture of said flange with the first mentioned cover blank portion engages and including a terminal extent angular thereto directed generally axially in the same axial direction, whereby as said axial compression is imposed upon said flange by said third die member the portion of said flange adjacent the first mentioned die member will work generally radially away from its initial position along said sloping surface portion to said terminal extent thereof which serves as a stop upon said radial working and in the continuation of the axial compression by said third forming die the next adjacent portion of the flange will collapse generally axially onto the radially worked portion of the flange to provide a flange fold directed generally axially outwardly and radially.

4. In a wheel structure including tire rim and body parts with annularly spaced rigid generally radially extending retaining bumps on one of said parts provided with axially inwardly and radially slanted camming shoulders, a cover for disposition over both of said parts comprising a cover member having intermediately thereof an annular generally radially extending and axially outwardly sloping narrow resiliently deflectable flange fold resiliently engageable in snap-on, pry-off relation with said shoulders on the bumps and by camming generally axially inwardly thereon driving the cover axially inwardly toward the wheel, the cover member on one side of said flange fold being a resiliently yieldable generally axially extending portion of the cover and on the opposite side of the flange fold being a portion slit to increase its flexibility with the flange fold in deflections thereof in engagement with the bumps.

5. In a wheel structure including tire rim and body parts with annularly spaced rigid generally radially extending retaining bumps on one of said parts provided with axially inwardly and radially slanted camming shoulders, a cover for disposition over both of said parts comprising a cover member having intermediately thereof an annular generally radially extending and axially outwardly sloping narrow resiliently deflectable flange fold resiliently engageable in snap-on, pry-off relation with said shoulders on the bumps, the cover member on opposite sides of said flange fold being resiliently yieldable with the flange fold in deflections thereof in engagement with the bumps, said flange fold having an axially inner generally axially outwardly and radially extending oblique cam surface portion of susbtantial width cammingly engageable with the bumps to cam thereover, said flange fold having a generally axially outwardly directed retaining edge extremity cammingly engageable with the shoulders on the retaining bumps to draw the cover axially inwardly toward the wheel.

6. In a method of making a wheel cover, shaping a sheet metal blank into circular radially inner and outer portions with a generally axially extending flange therebetween, working an axially inner axially outwardly extending portion of said flange into generally radially inwardly offset relation to its original position, and foldingly collapsing an intermediate portion of said flange axially inwardly upon the radially outer side of the radially inwardly worked portion to form a generally radially inwardly and axially outwardly extending resilient annular fold flange for retaining engagement with retaining bumps on a wheel, and subdividing the circular portion of the axially inner side of the fold flange into a plurality of resilient spoke portions so as to enhance the resilient deflectability of this circular portion.

7. In a wheel structure including a tire rim and body parts with annularly spaced rigid generally radially extending retaining bumps on one of said parts, a cover for disposition over both of said parts comprising a cover member having intermediately thereof an annular generally radially extending and axially outwardly sloping narrow resiliently deflectable flange fold resiliently engageable in snap-on, pry-off relation with the bumps, the cover member on opposite sides of said flange fold being resiliently yieldable with the flange fold in deflections thereof in engagement with the bumps, the cover member on one side of said flange fold being subdivided into a plurality of resilient spokes having turned flange means thereon engageable against the wheel for retaining the cover against turning.

8. In a method of making a wheel cover, shaping a metal plate into circular radially inner and outer portions with a generally axially extending flange therebetween, working an axially inner axially outwardly extending portion of said flange into generally radially inwardly offset and axially outwardly and radially inwardly sloping relation to its original position while holding said flange portion substantially against axial displacement and foldingly collapsing an intermediate portion of said flange axially inwardly telescopically about and upon the radially outer side of the radially inwardly worked portion to form therewith a generally radially inwardly and axially outwardly extending resilient annular fold flange for retaining engagement with retaining bumps on a wheel.

9. In a wheel structure including a tire rim and a disk spider wheel body supporting the tire rim and having an annular nose bulge provided at the radially outer side thereof with a generally radially outwardly facing shoulder from which project generally radially and axially outwardly cover retaining bumps having generally undercut radially and axially inwardly sloping shoulders, a cover for disposition at the outer side of the wheel having a central portion for overlying the wheel body including the nose bulge and a radially outer portion for overlying the tire rim with an intermediate portion between said inner and outer portions, and a narrow return bent resiliently deflectable flange fold adjacent juncture of the crown and intermediate portions of the cover directed generally radially inwardly and axially outwardly and engageable retainingly under resilient tension cammingly with the shoulders of the retaining bumps, the cover on opposite sides of said flange fold being resiliently yieldable with the flange fold in deflections thereof for interengagement with the bumps, the material of the cover on one side of said flange fold being slit to increase its flexibility.

10. In a cover for disposition at the outer side of a vehicle wheel, a cover of sheet material having radially inner and outer portions with a generally axially extending flange portion therebetween with a substantial continuous annular area of the flange portion folded upon itself into a generally axially outwardly and radially extending annular flange fold for retaining engagement with bumps on a wheel, said continuous annular folded flange portion being defined on its axially inner side by a continuous oblique annular cam face engageable cammingly with the bumps on pressing the same past the bumps, and the cover portion at the axially inner side of the flange fold projecting substantially axially inwardly therebeyond for bottoming against the wheel, said cover portion connected to and beyond the cam face being subdivided into a series of resilient spokes to increase the resilient deflectability thereof.

References Cited in the file of this patent

UNITED STATES PATENTS

| | | |
|---|---|---|
| 2,020,885 | Gatta | Nov. 12, 1935 |
| 2,162,736 | Lyon | June 20, 1939 |
| 2,163,003 | Lyon | June 20, 1939 |
| 2,163,005 | Lyon | June 20, 1939 |
| 2,220,340 | Lyon | Nov. 5, 1940 |
| 2,254,376 | Lyon | Sept. 2, 1941 |
| 2,282,588 | Lyon | May 12, 1942 |
| 2,308,617 | Lyon | Jan. 19, 1943 |
| 2,445,330 | Lyon | July 20, 1948 |
| 2,544,703 | Lyon | Mar. 13, 1951 |